US011057981B2

(12) United States Patent
Takacs et al.

(10) Patent No.: US 11,057,981 B2
(45) Date of Patent: Jul. 6, 2021

(54) SYSTEM AND METHOD FOR PROVIDING HIGH POWER FACTOR WIRED LAMP CONTROL

(71) Applicant: ENERGY FOCUS, INC., Solon, OH (US)

(72) Inventors: Laszlo A. Takacs, San Mateo, CA (US); Attila Tomasovics, San Jose, CA (US); Greg Flies, Chagrin Falls, OH (US); David Nicolay, Fairview Park, OH (US); John Davenport, Tucson, AZ (US); Zhang Liang, Guangdong (CN); Jay Seifert, Solon, OH (US)

(73) Assignee: ENERGY FOCUS, INC., Solon, OH (US)

( * ) Notice: Subject to any disclaimer, the term of this patent is extended or adjusted under 35 U.S.C. 154(b) by 0 days.

(21) Appl. No.: 16/884,719

(22) Filed: May 27, 2020

(65) Prior Publication Data
US 2021/0051786 A1 Feb. 18, 2021

Related U.S. Application Data

(60) Provisional application No. 63/006,814, filed on Apr. 8, 2020, provisional application No. 62/887,406, filed on Aug. 15, 2019.

(51) Int. Cl.
*H05B 45/20* (2020.01)
*H05B 47/185* (2020.01)
(Continued)

(52) U.S. Cl.
CPC ............. *H05B 47/185* (2020.01); *H04B 3/02* (2013.01); *H04L 25/02* (2013.01); *H05B 45/10* (2020.01); *H05B 45/20* (2020.01)

(58) Field of Classification Search
CPC ........ H05B 45/10; H05B 45/20; H05B 45/36; H05B 47/185; H02M 3/156; Y02B 70/10; H04L 25/02
See application file for complete search history.

(56) References Cited

U.S. PATENT DOCUMENTS 7,906,941 B2 * 3/2011 Jayaraman .......... H02M 1/4225
323/222
9,736,911 B2 * 8/2017 Taipale .................. H05B 45/10
(Continued)

FOREIGN PATENT DOCUMENTS

WO 2018/071692 A1 4/2018

OTHER PUBLICATIONS

International Search Report and Written Opinion dated Aug. 28, 2020, 12 pages.

*Primary Examiner* — Haissa Philogene
(74) *Attorney, Agent, or Firm* — Rankin, Hill & Clark LLP

(57) ABSTRACT

A system and method for providing high power factor wired lamp control that include receiving a lighting control input though a switch that is associated with at least one of: an operation and a function of at least one lamp. The system and method also include processing a digital data packet that includes at least one electronic data command associated with the lighting control input. The system and method additionally include implementing at least one powerline interruption associated with an AC power cycle to communicate the digital data packet to the at least one lamp. The system and method further include controlling the at least one lamp to operate based on the lighting control input based on the receipt of the digital data packet communicated through the AC power cycle.

25 Claims, 10 Drawing Sheets

(51) Int. Cl.
  *H05B 45/10*   (2020.01)
  *H04B 3/02*   (2006.01)
  *H04L 25/02*   (2006.01)

(56) References Cited

U.S. PATENT DOCUMENTS 9,900,963 B1 * 2/2018 Doll ..................... H05B 45/00
  2012/0091915 A1  4/2012 Ilyes et al.
  2019/0098725 A1 * 3/2019 Sadwick ............. H05B 47/175

\* cited by examiner

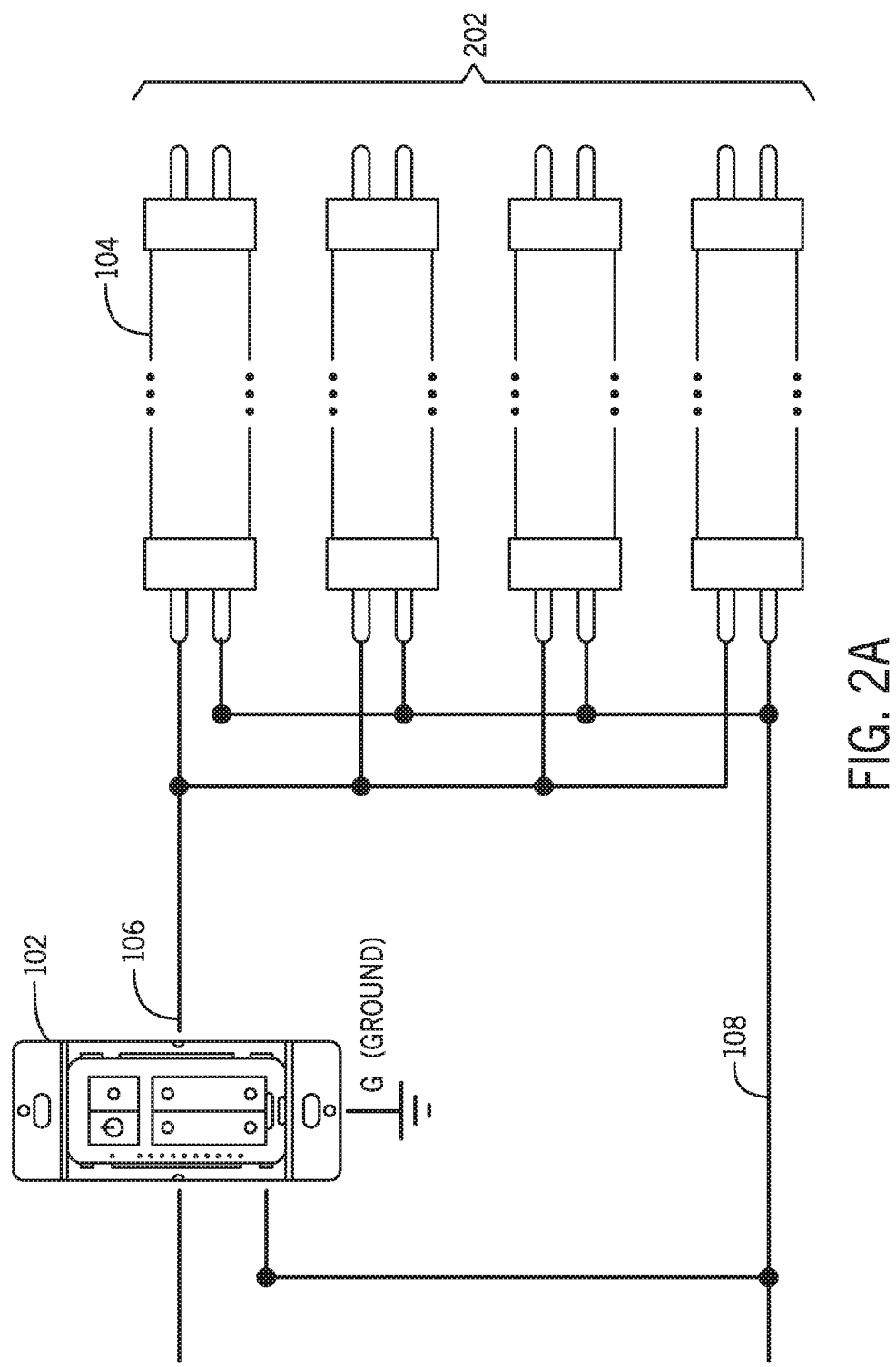

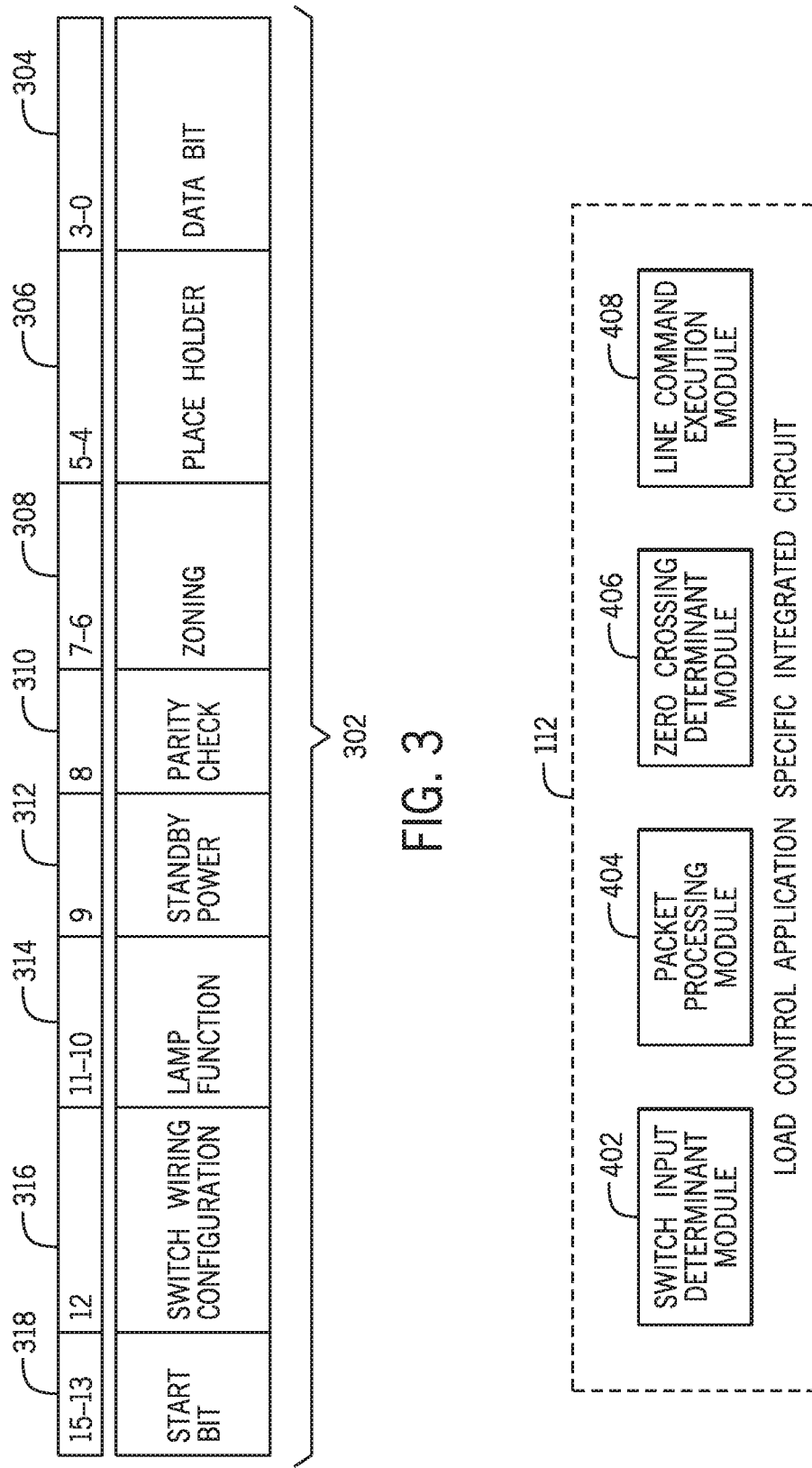

SYSTEM AND METHOD FOR PROVIDING HIGH POWER FACTOR WIRED LAMP CONTROL

CROSS-REFERENCE TO RELATED APPLICATION

This application claims priority to U.S. Provisional Application Ser. No. 62/887,406 filed on Aug. 15, 2019, which is expressly incorporated herein by reference. This application also claims priority to U.S. Provisional Application Ser. No. 63/006,814 filed on Apr. 8, 2020, which is expressly incorporated herein by reference.

BACKGROUND

Lighting dimmers that are used to control a brightness associated with the output of a light source (e.g., one or more light bulbs/tubes) are typically configured as phase control switches. The functionality of these switches are mainly centered around controlling a dimming level of lighting and do not extend to light color changing and/or providing additional lighting features. The phase control switches are limited to controlling the dimming level of the lighting by using a triode for alternating current (TRIAC) transistor to switch an electric power source to the light source between ON and OFF states for a portion of an AC cycle that corresponds to a desired dimming level. This switching of the electric power source between the ON and OFF states results in the power line being switched to the OFF state during a significant portion of the AC cycle thereby chopping up the electrical power flow to the light source. This results in a degradation with respect to the quality of power that is flowing to the lighting source. This degradation of quality of power is exhibited based on a reduced power factor (e.g., less than a power factor of '1') and an increased total harmonic distortion present in the AC cycle of the electrical power flow.

The reduction in power factor may also have a detrimental affect with respect to costs to operate the lighting source. Particularly, in commercial settings, where there may be numerous lighting sources that may operate, the use of the phase control dimmer switches may result in requiring a higher amount of current to achieve a requisite operating level of power. For example, the utilization of the phase control dimmer switches may result in a reduced power factor (e.g., 0.5) with respect to the power flowing to light sources which may requiring twice the volt amperes to achieve a requisite amount of power to operate the light sources. Accordingly, higher energy costs may be measured. Furthermore, the total harmonic distortion resulting from the use of such dimmers may be very large (20%-40%) which may contribute to compromising the integrity of the powerline. Consequently, the use of dimmers is not prevalent in many commercial settings and light dimming capabilities are not readily utilized.

BRIEF DESCRIPTION

In convention approaches, adding dimming and color tuning in retrofit situations has traditionally required addition of costly and complex powerline modulation, control wires, and/or an addition of radio frequency transceivers to lamps and lamp controls. According to one aspect, the present disclosure discloses a system that provides a functionality of communicating one or more commands between a lighting control switch and a lamp that may be included within a group of lamps by introducing one or more brief interruptions to an AC power cycle supply voltage of the lamp. The one or more commands may include enablement commands, disablement commands, modification of brightness settings, modification of color temperature settings, and/or modification of alert settings of the lamp.

In particular, the lighting control switch may be configured provide lamp control through the AC power cycle by communicating one or more digital data packets that include the one or more commands during the brief interruptions in the supply voltage from the lighting control switch to the lamp. The lamp may in turn interpret the interruptions as commands to enable the lamp, disable the lamp, and/or change one or more settings associated with the lamp. Since the interruptions occur briefly to signal one or more desired changes based on inputs received through the lighting control switch, the integrity of the power line is not compromised, as is the case, for example, with traditional phase control dimming approaches.

Accordingly, the functionality of communicating commands and associated data between the lighting control switch and the lamp through AC power cycle is consistent with achieving with a high power factor that by maintaining a substantially sinusoidal voltage for a power factor corrected load that ensures that there is low total harmonic distortion with respect to the power line. This functionality may result in cost savings with respect to customized lighting solutions particularly with respect to commercial settings. Since the communication of data is completed through the hardwired power lines between the lighting control switch and the lamp, the system provides a secure wired communication means that is not susceptible to common cybersecurity issues that may arise with respect to certain wireless communication protocols.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 2A is an illustrative example of an environment that includes a modern electrical configuration that includes a connection between a neutral wire and a switch according to an exemplary embodiment of the present disclosure;

FIG. 3 is an illustrative example a digital data packet that includes binary codes that are associated to inputs that are received through a switch according to an exemplary embodiment of the present disclosure;

FIG. 4 is a schematic view of a plurality of modules of a load control application-specific integrated circuit of the switch that may execute computer-implemented instructions for providing high power factor wired lamp control according to an exemplary embodiment of the present disclosure;

DETAILED DESCRIPTION

Figure 1:
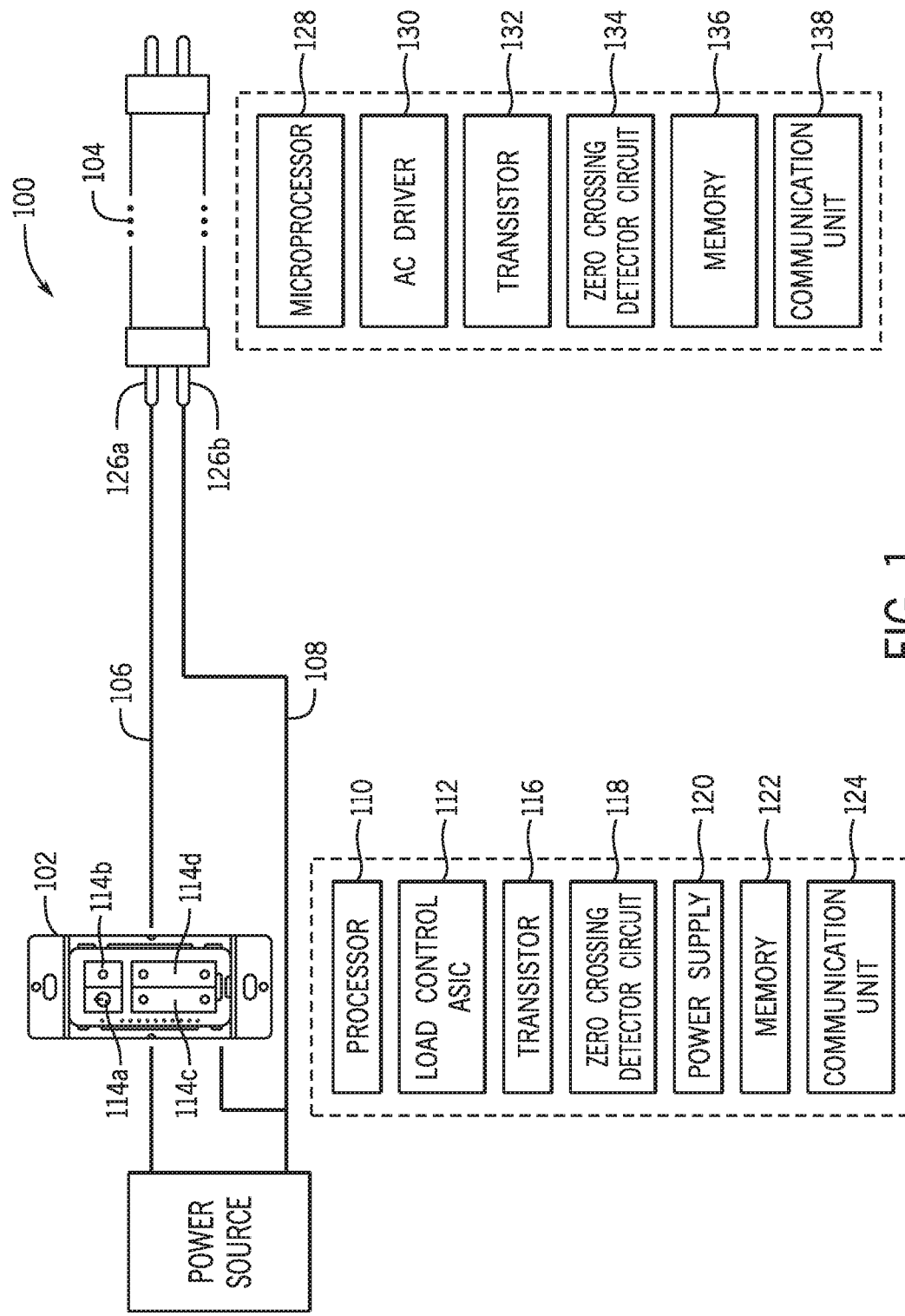
FIG. 1 is a schematic view of an exemplary system for providing high power factor wired lamp control according to an exemplary embodiment of the present disclosure.

The following includes definitions of selected terms employed herein. The definitions include various examples and/or forms of components that fall within the scope of a term and that can be used for implementation. The examples are not intended to be limiting.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others.

"Computer communication," as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

An "input device," as used herein may include devices for controlling different components, systems, and subsystems. The term "input device" includes, but it not limited to: push buttons, rotary knobs, ON/OFF controls, sliding controls, and the like. The term "input device" additionally includes graphical input controls that take place within a user interface which may be displayed by various types of mechanisms such as software and hardware based controls, interfaces, or plug and play devices.

A "processor," as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "memory," as used herein may include volatile memory and/or nonvolatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

A "module," as used herein, includes, but is not limited to, hardware, firmware, software in execution on a machine, and/or combinations of each to perform a function(s) or an action(s), and/or to cause a function or action from another module, method, and/or system. A module may include a software controlled microprocessor, a discrete logic circuit, an analog circuit, a digital circuit, a programmed logic device, a memory device containing executing instructions, and so on.

An "operable connection," as used herein may include a connection by which entities are "operably connected", is one in which signals, physical communications, and/or logical communications may be sent and/or received. An operable connection may include a physical interface, a data interface and/or an electrical interface.

An "output device," as used herein may include devices that may derive from electronic components, systems, subsystems, and electronic devices. The term "output devices" includes, but is not limited to: display devices, and other devices for outputting information and functions.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

A "power factor corrected" load circuit is one in which the current the load draws is engineered to follow proportionally to the impressed voltage. A sinusoidal voltage impressed across a perfectly engineered "power factor corrected" load, for example, results in a sinusoidal current through the load in phase with the impressed voltage.

I. System Overview

Referring now to the drawings, wherein the showings are for purposes of illustrating one or more exemplary embodiments and not for purposes of limiting the same, FIG. 1 is a schematic view of an exemplary system 100 for providing high power factor wired lamp control according to an exemplary embodiment of the present disclosure.

As shown, the system 100 of FIG. 1 may include a lighting control switch (switch) 102 that may be configured to operably control enablement, disablement, and/or one or more settings associated with an electrical load. In an exemplary embodiment, the electrical load that may be operably controlled by the switch 102 may include a lamp 104 that may be configured to output one or more levels of light that are sufficient to comply with regulatory requirements for lighting one or more environments. In one or more configurations, the lamp 104 may be configured as a light, a lighting fixture, or an electronic module that may be configured to control one or more lighting sources. The switch 102 and the lamp 104 may be configured to be utilized in commercial environments such as schools, office buildings, hospitals, hotels, commercial facilities (e.g., malls, sporting facilities, manufacturing facilities, etc.), and the like. Additionally, the switch 102 and the lamp 104 may be configured to be utilized in residential environments such as homes, apartment units, and the like.

With respect to the operation of the lamp 104, the switch 102 may be configured to receive inputs from a user (not shown) to enable the lamp 104, disable the lamp 104, and/or to set or change one or more settings associated with the lamp 104. The one or more settings associated with the lamp 104 that may be operably controlled through the switch 102 may include, but may not be limited to, brightness settings to brighten or dim light output by the lamp 104, color temperature settings to change a color of light output by the lamp 104, and/or alert settings to change one or more emergency flashing alerts output by the lamp 104 during particular circumstances (e.g., fire alerts, security alerts). It is to be appreciated that additional types of settings may be controlled through the switch 102 that may be associated with the functionality of the lamp 104 and/or one or more electronic components that may be connected (e.g., wired, wirelessly) to the lamp 104 (e.g., motion sensors, security systems, climate control units).

In one embodiment, the lamp 104 may be included in a group of lamps that may include a plurality of lamps that may individually and/or collectively be operably controlled through the use of the switch 102. For example, the switch 102 may be used to individually control a brightness and/or color temperature of the lamp 104 and one or more lamps that are included within a group of lamps separately from one or more additional lamps that may be included within a separate group of lamps. Accordingly, the lamp 104 and/or one or more additional lamps within one or more groups of lamps may be selectively or collectively enabled and/or disabled through one or more inputs that may be provided through the switch 102. Additionally, the lamp 104 and/or one or more additional lamps within the group of lamps may be selectively or collectively operably controlled to provide various levels of brightness, various levels of color temperatures, and/or various types of alerts based on the operation of the switch 102.

As discussed in more detail below, the switch 102 may be configured to utilize existing power lines that may be installed in commercial and/or residential environments to communicate one or more commands associated with inputs received through the switch 102. Such inputs may be interpreted to send one or more commands to the lamp 104 and/or a group of lamps through the use of an Alternating Current power cycle (AC power cycle).

As represented in the illustrative example of FIG. 2A, in one or more environments that include a modern electrical configuration, the switch 102 may be configured to receive one or more inputs and may communicate one or more commands associated with the inputs to a group of lamps 202 through the use of the AC power cycle that may be supplied to flow an electric power source through a hot wire 106 that provides a controlled line to the group of lamps 202. Additionally, data may also be communicated through the electric power flow back from the group of lamps 202 through a neutral wire 108 to the switch 102 to complete a circuit.

Figure 2B:
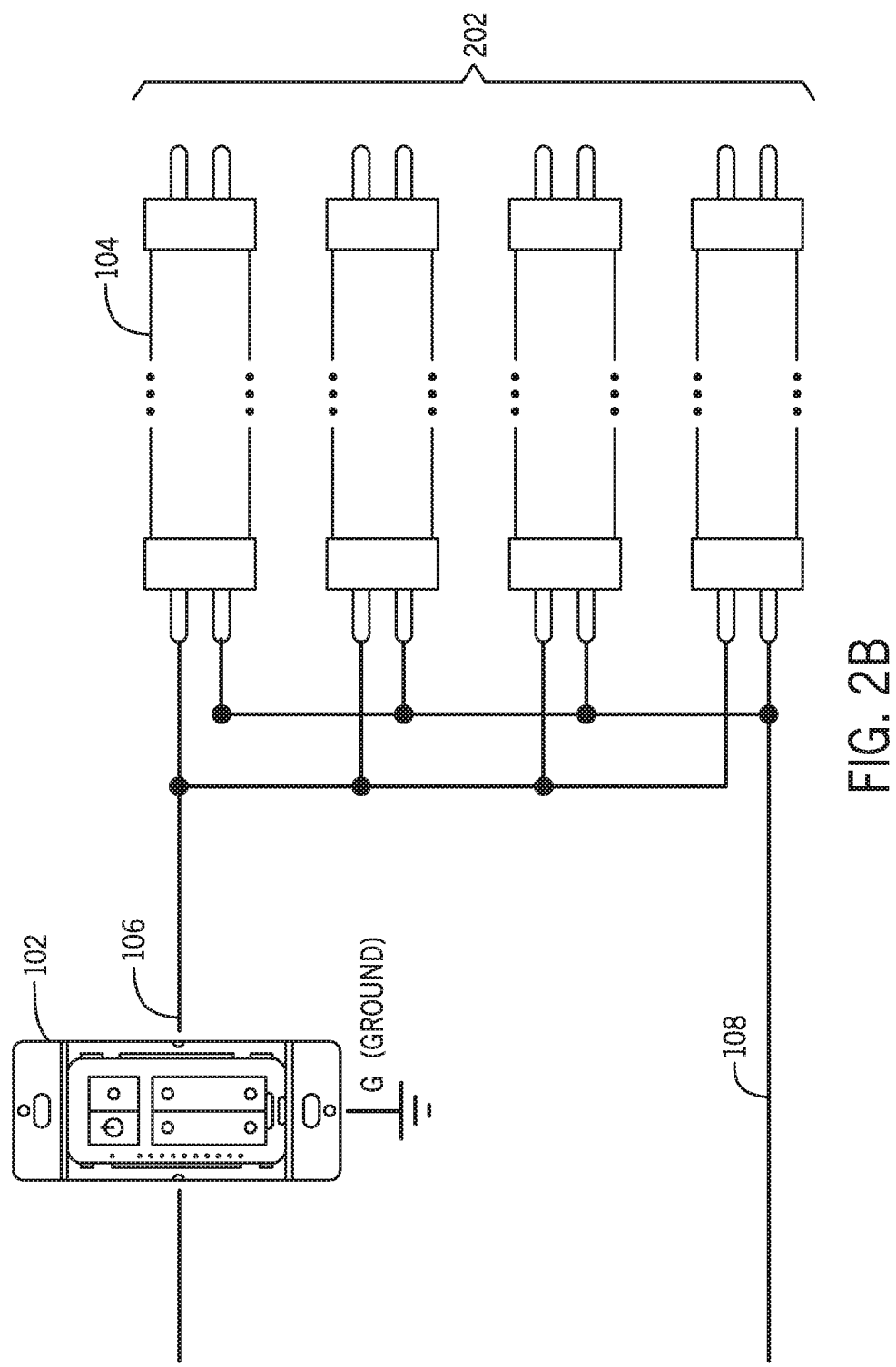
FIG. 2B is an illustrative example of an environment that includes a legacy electrical configuration that does not include a connection between the neutral wire and the switch according to an exemplary embodiment of the present disclosure.

As shown in the illustrative example of FIG. 2B, in one or more environments that include a legacy electrical configuration, the switch 102 may be configured to communicate one or more commands associated with inputs received to the group of lamps 202 through the use of the AC power cycle without a connection of the neutral wire 108 to the switch 102. As discussed below, the switch 102 may be configured to communicate the one or more commands through the AC power cycle that may be supplied to flow electricity through the hot wire 106 to the lamp 104 by being periodically disabled and self-powered for one or more predetermined periods of time to communicate the one or more commands to the group of lamps 202.

In both configurations discussed above with respect to FIG. 2A and FIG. 2B (and as represented in FIG. 1), the functionality of communicating commands and associated data between the switch 102 and the group of lamps 202 (that includes the lamp 104) through the AC power cycle is consistent with achieving a high power factor (e.g., >0.9) by maintaining a substantially sinusoidal voltage (e.g., little or no change in the shape of the AC sinusoidal wave for the configuration of FIG. 2A and minimal change for the configuration of FIG. 2B) for a power factor corrected load. This functionality also ensures that there is low total harmonic distortion (e.g., less than 10% in the current) with respect to the power line. It is to be appreciated that the present disclosure and embodiments discussed herein may apply to one switch and/or a plurality of switches and/or one lamp and/or a plurality of lamps of one or more groups of lamps. However, for purposes of simplicity, the functionality of the system 100 will mainly be described with respect to a single switch 102 and a single lamp 104 configuration.

Referring again to FIG. 1, in an exemplary embodiment, the switch 102 may include a plurality of components that may be operably controlled by a processor 110. The processor 110 may be configured to execute one or more operating systems, executable instructions, sensor logic, and the like. The processor 110 may also include respective internal processing memory, an interface circuit, and bus lines for transferring data, sending commands, and communicating with the plurality of components of the switch 102. In one or more configurations, the processor 110 may include a respective communication device (not shown) for sending data internally to components of the switch and communicating with externally hosted computing systems (not shown) (e.g., external to the switch 102).

The processor 110 may include one or more application-specific integrated circuit(s). In one embodiment, the processor 110 may include a load control application-specific integrated circuit (load control ASIC) 112. In one configuration, the load control ASIC 112 may be included in the form of an integrated circuit that is embedded as part of the processor 110. In some configurations, the load control ASIC 112 may include its own microprocessor and memory (both not shown). The load control ASIC 112 may include a plurality of electronic modules (discussed below with respect to FIG. 4) that may be configured to provide high power factor wired lamp control of the lamp 104 through the switch 102.

In one embodiment, the load control ASIC 112 may be configured as a control and operation means to receive one or more inputs through one or more lighting control input buttons (input buttons) 114a-114d of the switch 102 and/or externally hosted computing systems. The externally hosted computing systems may include, but may not be limited to, portable devices, smart devices, remote controls, and the like that may be executing software applications that provide an external interface to the switch 102. For example, the load control ASIC 112 may be configured to receive one or more inputs that may be associated with the enablement, disablement, modification of brightness settings, modification of color temperature settings, and/or modification of alert settings of the lamp 104 through the one or more input buttons 114a-114d of the switch 102 (e.g., as input by a user) and/or a software application that provides automated inputs (e.g., based on a time of day, sunrise/sunset times, environmental conditions, etc.) to the switch 102 that may be executed on a smart home device.

As discussed in more detail below, the load control ASIC 112 may be configured to process one or more digital data packets that include electronic data commands that are associated with the one or more inputs received through the switch 102 based on the input of the one or more input buttons 114a-114d of the switch 102 and/or inputs provided from the externally hosted computing systems. The load control ASIC 112 may be generally configured to communicate the one or more digital data packets to the lamp 104 to thereby execute one or more associated commands to the lamp 104 through the AC power cycle. In particular, the load control ASIC 112 may be configured to interrupt the AC power cycle for brief predetermined periods of time (e.g., 1 ms) to send the one or more digital data packets to the lamp 104. The brief duration of time of the brief interruptions to the AC power cycle does not influence the operation of the lamp 104. In other words, the interruptions to the supply voltage to the lamp 104 are short enough such that there is no disturbance to the operation of the lamp 104. An AC driver 130 of the lamp 104 may interpret the brief interruptions to the supply voltage to determine that the switch 102 is communicating one or more commands to the lamp 104. A microprocessor 128 of the lamp 104 may thereby analyze the one or more digital data packets that are communicated to the lamp 104 through the AC power cycle to enable the lamp 104, disable the lamp 104, modify brightness settings of the lamp 104, modify color temperature settings of the lamp 104, and/or modify alert settings based on inputs received through the switch 102.

In some configurations, the AC power cycle may also be utilized for bilateral communications between the switch 102 and the lamp 104 based on a modulation of line impendence that may be implemented by the microprocessor 128 of the lamp 104 based on energy storage of the lamp 104. As such, the switch 102 may communicate one or more digital data packets to the lamp 104 to be interpreted to operably control operation of the lamp 104. Additionally, the microprocessor 128 of the lamp 104 may also communicate one or more digital data packets to the switch 102 to send one or more status messages to the switch 102. The status messages may include, but may not be limited to, a confirmation of a brightness/color temperature/alert setting change, a health status of the lamp 104, a lighting source (bulb) status of the lamp 104, an alert associated with a third-party component/computing system associated with the lamp 104 (e.g., security system, motion sensor), and the like.

The switch 102 and lamp 104 may also be configured to allow additional types of lighting input devices to be added to the system 100. For example, the load control ASIC 112 may be configured to receive inputs provided through traditional phase control dimmer switches to communicate the one or more digital data packets to the lamp 104 to thereby execute one or more associated brightness settings of the lamp 104 through the AC power cycle of the power line.

With continued reference to FIG. 1, the processor 110 of the switch 102 may be operably connected to a transistor 116. The transistor 116 may be configured to switch and/or interrupt electric power through the power line. The transistor 116 may be configured to output electric power through the power line to the lamp 104. Additionally, the transistor 116 may be configured to receive a flow of electricity to the switch 102 which may be used to power the switch 102. In one embodiment, the transistor 116 may be operably connected to a zero crossing detector circuit 118 that may be connected to a ground wire and may be configured to detect when an AC load voltage is crossing zero volts in the AC power cycle.

Figure 7A:
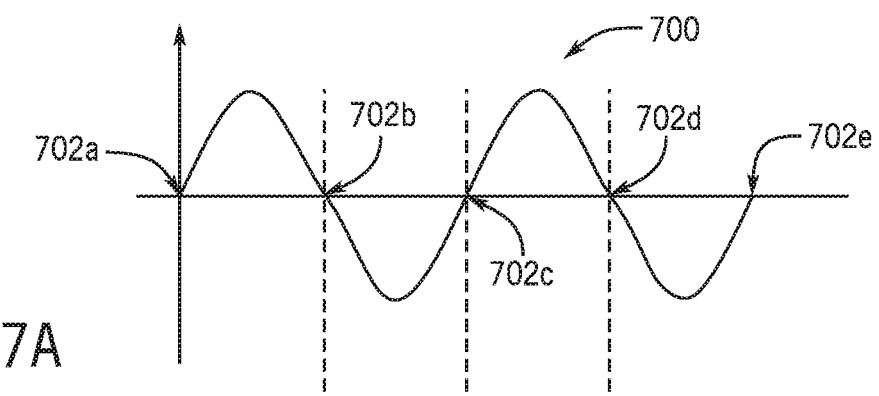
FIG. 7A is an illustrative example of a normal cycle of an AC sinusoidal waveform of the AC power cycle according to an exemplary embodiment of the present disclosure.

The load control ASIC 112 may be configured to operably control the zero crossing detector circuit 118 to analyze the AC power cycle during a normal cycle as the AC power cycle is included as an AC sinusoidal waveform (shown in FIG. 7A). The zero crossing detector circuit 118 may be configured to detect a zero crossing of the AC power cycle when the AC load voltage is crossing zero volts. As discussed below, upon the zero crossing detector circuit 118 detecting the zero crossing, the load control ASIC 112 may be configured to control the transistor 114 of the switch 102 to interrupt a rising edge or a falling edge of the AC sinusoidal waveform near the zero crossing of the AC waveform. Accordingly, the load control ASIC 112 may be configured to communicate the one or more digital data packets to the lamp 104 to be interpreted by the microprocessor 128 to thereby execute one or more associated operations and/or functions of the lamp 104 based on one or more inputs of the switch 102.

In one configuration, the zero crossing detector circuit 118 may be configured as an opto-isolator circuit that is isolated from a main circuit of the switch 102 (e.g., that includes the additional components of the switch 102). The isolated zero crossing detector circuit 118 may be configured to measure the zero crossing with respect to the hot wire 106 and the ground wire by drawing power through a ground circuit. In particular, the zero crossing detector circuit 118 may be configured as an ultra-low current switch zero crossing circuit to measure the zero crossing through the ground wire (e.g., capable of drawing more than 500 microamperes through the ground circuit).

In one or more embodiments, the transistor 116 may be operably connected to a power supply 120 of the switch 102. In environments with modern electrical configurations in which the neutral wire 108 is connected to the switch 102 and the flow of electricity back is returned from the lamp 104 to the switch 102 through the neutral wire 108, returned power may be fed through the transistor 114 to the power supply 120. The power supply 120 may be configured to pull a required amount of electricity to operate the switch 102. As discussed below, in environments with legacy electrical configurations in which there is no connection between the neutral wire 108 and the switch 102, the power supply 120 may be fed electric power based on the voltage that is appearing across the switch 102 in its disabled state before the AC load voltage crosses zero volts (i.e., prior to an AC sinusoidal wave crossing the zero crossing) and may thereby be utilized to operate the switch to drive the transistor 116.

Accordingly, the load control ASIC 112 may operate to communicate one or more digital data packets to the lamp 104 during the brief interruptions to the AC power cycle supply voltage to the lamp 104 to thereby control operations and functions of the lamp 104 based on inputs received through the switch 102. In other words, the switch 102 may continue to operate to send one or more commands to the lamp 104 without the connection of the neutral wire 108 to the switch 102 to allow uninterrupted communication of one or more digital data packets to or from the lamp 104.

In an exemplary embodiment, the processor 110 of the switch 102 may also be operably connected to a memory 122 of the switch 102. The memory 122 may be configured to store data files associated with one or more applications, operating systems, user interfaces, and executable instructions, including, but not limited to executable instructions that are executed by the load control ASIC 112 of the processor 110. The memory 122 may also be configured to store encrypted binary codes that pertain to respective settings that are associated to inputs that may be received through the input buttons 114a-114d of the switch 102 and/or through externally hosted computing systems.

The encrypted binary codes stored on the memory 122 may pertain to enablement and disablement settings of the lamp 104 that may be associated with the input of an ON/OFF input button 114a on the switch 102 and/or respective inputs provided from externally hosted computing systems. The encrypted binary codes stored on the memory 122 may also pertain to stored brightness, color temperature, and/or alert settings that may be associated with the input of a favorites input button 114b of the switch 102 and/or respective inputs provided from externally hosted computing systems. The encrypted binary codes stored on the memory 122 may additionally pertain to a last implemented lamp state that may pertain to brightness settings, color temperature settings, and/or alert settings that may be implemented when the lamp 104 and/or one or more groups of lamps were last enabled. Additionally, the encrypted binary codes stored on the memory 122 may pertain to alert settings that may enable the lamp 104 to provide various types of lighting features (e.g., flashing at various frequencies, implementing color changes, implementing brightness changes) that may be executed to provide one or more types of emergency alerts, alarms, and/or notifications.

In one or more embodiments, the encrypted binary codes stored on the memory 122 may additionally pertain to brightness settings of the lamp 104 (e.g., 0% to 100%) that may be associated with the input of a brightness/dimming input button 114c of the switch 102 and/or respective inputs provided from externally hosted computing systems. Likewise, encrypted binary codes stored on the memory 122 may pertain to color temperature settings of the lamp 104 (e.g., visible color spectrum 400 nm to 740 nm) that may be associated with the input of a color temperature input button 114d of the switch 102 and/or respective inputs provided from externally hosted computing systems.

In an exemplary embodiment, the load control ASIC 112 of the processor 110 may be configured to interpret inputs received through the input buttons 114a-114d of the switch 102 and/or respective inputs provided from externally hosted computing systems that provide an external interface to the switch 102. The load control ASIC 112 may thereby determine the type of input with respect to the operation of the lamp 104, the functionality of the lamp 104, and/or additional details that may be associated with the operation and function of the lamp 104 and/or one or more additional lamps that may be included within one or more groups of lamps. In one configuration, the load control ASIC 112 may be configured to access the memory 122 and may retrieve one or more stored binary codes that consist of one or more binary code values that are associated with one or more inputs received through the switch 102. In other words, the one or more stored binary codes may include one or more binary code values that pertain to one or more respective input commands that may be executed to control the operation and/or function of the lamp 104 based on one or more inputs received through the switch 102.

In one configuration, upon retrieving one or more binary codes associated with the one or more inputs received through the switch 102 and/or the operation and function of the lamp 104, the load control ASIC 112 may be configured to process one or more digital data packets that include the respective binary codes associated with the one or more inputs received through the switch 102. In particular, the load control ASIC 112 may be configured to process the one or more digital data packets in one or more bit lengths to be further communicated through the interruptions to the AC power cycle to the lamp 104 to be executed by the lamp 104.

As shown in an illustrative example of FIG. 3, the load control ASIC 112 may be configured to process each of the digital data packets 302 as a 16-bit data packet that may include portions 304-318. Each of the portions 304-318 may be allocated to particular bits and may be encrypted with binary codes that may be associated with particular operability and/or functionality of the lamp 104. As an illustrative example, a portion 314 of each of the digital data packets 302 may be encrypted with binary codes that pertain to functionality settings associated with brightness, color temperature, and/or alerts that may be based on the inputs received through the switch 102.

In one configuration, a portion 308 may be encrypted with binary codes that are associated with zoning of one or more lamps to establish more groups of lamps that may be set at one or more respective brightness settings, respective color temperature settings, and/or respective alert settings. A portion 306 may be encrypted with binary codes that are associated with favorite settings based on the input of the favorites input button 114b of the switch 102. Additionally, the portion 306 may be encrypted with binary codes that are associated with a last implemented lamp state that may pertain to brightness settings, color temperature settings, and/or alert settings that may be implemented when the lamp 104 and/or one or more groups of lamps were last disabled (e.g., brightness settings implemented by the lamp 104 when it was last turned off.) It is to be appreciated the portions 304-318 of each of the digital data packets 302 may be encrypted with various binary and/or alternate programming code formats that may be associated with the operability and functionality of the lamp 104.

Referring again to FIG. 1, the processor 110 of the switch 102 may also be operably connected to a communication unit 124 of the switch 102. The communication unit 124 may be capable of providing wired or wireless computer communications utilizing various protocols to send/receive non-transitory signals internally to the plurality of components of the switch 102 and/or externally to external devices such as one or more externally hosted computing systems that may be executing associated software applications to provide an external interface to the switch 102. Generally, these protocols include a wireless system (e.g., IEEE 802.11 (Wi-Fi), IEEE 802.15.1 (Bluetooth®)), a near field communication system (NFC) (e.g., ISO 13157), a local area network (LAN), and/or a point-to-point system. The communication unit 124 may also be configured to receive radio frequency signals that may be communicated through one or more radio frequency channels/bands.

In one embodiment, the communication unit 124 may be configured to communicate (e.g., wirelessly exchange electronic data) with one or more externally hosted computing systems to receive data that may be associated with one or more inputs. Such inputs may be received through one or more of the externally hosted computing systems to enable the lamp 104, disable the lamp 104, and/or set or change one or more settings associated with the lamp 104 remotely from the switch 102 (e.g., without a physical input of one or more respective input buttons 114a-114d). Upon receiving respective communications of such inputs from one or more externally hosted computing systems, the communication unit 124 may be configured to provide respective data to the processor 110. Accordingly, the processor 110 may be configured to receive one or more lighting control inputs from the one or more externally hosted computing systems. Such inputs may be analyzed by the load control ASIC 112 in a similar manner as physical inputs to one or respective input buttons 114a-114d of the switch 102 to process one or more digital data packets 302 that may be further communicated through interruptions of the AC power cycle.

With particular reference to the lamp 104, as discussed the lamp 104 may include a microprocessor 128 that is configured to operably control the operation and functionality of the lamp 104. The lamp 104 may be configured in a variety of form factors and styles. In an exemplary embodiment, the lamp 104 may be configured as a tubular light emitting diode (TLED) lamp and may be of any number of lengths. In additional embodiments, the lamp 104 may be configured in various shape configurations and sizes (e.g., tubular shaped, circular shaped, globe shaped, twisted shaped). In some embodiments, the lamp 104 may be configured with various types of light sources (e.g., bulbs) (not shown) such as but not limited to, one or more LED light sources, one or more fluorescent light sources, one or more halogen light sources, and/or one or more incandescent light sources. The one or more light sources of the lamp 104 may be configured to be operably controlled by the microprocessor 128 to emit respective light in one or more specific manners that are specifically associated with one or more commands that are communicated from the switch 102. In other words, the microprocessor 128 may be configured to operably control one or more respective light sources of the lamp 104 and/or one or more groups of lamps based on one or more digital data packets that are communicated to the lamp 104 through the interruptions of the AC power cycle to the lamp 104.

In an exemplary embodiment, the microprocessor 128 may be configured to execute executable instructions, sensor logic, and the like. The microprocessor 128 may also include respective internal processing memory, an interface circuit, and bus lines for transferring data, sending commands, and communicating with the plurality of components of the lamp 104. In one or more configurations, the microprocessor 128 may include a respective communication device (not shown) for sending data internally to components of the lamp 104 and communicating with externally hosted computing systems (not shown) (e.g., external to the lamp 104).

The microprocessor 128 may be configured to execute instructions that may enable analysis of one or more digital data packets that may be communicated through the AC power cycle to a pair of primary electrical contacts 126a, 126b that are electrically conductive and may receive electric power in the form of the AC power cycle that is provided through the hot wire 106.

In an exemplary embodiment, as power is supplied to the lamp 104 through the AC power cycle to the pair of primary electrical contacts 126a, 126b, the AC power cycle may be received by the AC driver 130 of the lamp 104. The AC driver 130 may be configured to analyze the AC power cycle to determine if any interruptions occur with respect to the AC power cycle. In particular, the AC driver 130 may be configured to determine a value '0' during uninterrupted operation of AC power cycle and a value '1' that pertains to an interruption of the AC power cycle. The interruptions to the power cycle may be interpreted by the AC driver 130 as the communication of input commands from the switch 102 to the lamp 104. The AC driver 130 may accordingly analyze the AC power cycle to extract one or more digital packets that may be communicated through the AC power cycle. The AC driver 130 may thereby communicate the extracted digital data packets to the microprocessor 128 to be analyzed to control one or more lighting sources based on the inputs received through the switch 102. In one configuration, the AC driver 130 may be electrically connected to the one or more lighting sources of the lamp 104 and may be configured to convert the AC power cycle received through the pair of primary electrical contacts 126a, 126b to DC voltage which is suitable for the operation of the one or more lighting sources.

Accordingly, upon receiving the one or more digital data packets from the AC driver 130, the microprocessor 128 may be configured to operably control the AC driver 130 to provide one or more levels of DC power to the one or more lighting sources to enable one or more lighting sources, disable one or more lighting sources, and/or operably control one or more lighting sources of the lamp 104 to provide one or more brightness/dimming levels, color temperature levels and/or alert levels based on respective settings encrypted within the one or more digital data packets communicated to the lamp 104 through the interruptions to the AC power cycle.

In one embodiment, the AC driver 130 may be operably connected to a power storage (not shown) that may be configured to store an amount of power that may be utilized to power the lamp 104 for one or more brief periods of time (e.g., 1-3 ms). Accordingly, in some configurations, if the power to the lamp 104 is briefly interrupted, the lamp 104 may be briefly powered through power stored on the power storage and sent through the AC driver 130 to allow the microprocessor 128 to operably control the lamp 104. As such, during enablement of the lamp 104 any minute interruptions in power flow to the lamp 104 may thereby be avoided based on the provision of the stored AC power that may be provided to the AC driver 130 from the operably connected power storage of the lamp 104. Consequently, the microprocessor 128 may continually control the operability and functionality of the lamp 104 as the AC power cycle is interrupted by the switch 102 during the brief predetermined periods of time.

In an exemplary embodiment, the microprocessor 128 of the lamp 104 may be operably connected to a transistor 132 of the lamp 104. The transistor 132 include a zero crossing detector circuit 134 that may be configured to detect that the switch 102 has been disabled and may send a corresponding signal to the microprocessor 128. The microprocessor 128 may thereby operably control the transistor 132 of the lamp 104 to switch to a load lowering impedance mode. In particular, the zero crossing detector circuit 134 of the transistor 132 may be configured to reduce the line impedance during the disablement of the switch 102 and the enablement of the load lowering impedance mode. The load lowering impedance mode allows the impendence to remain low until the voltage through the power line begins to rise which indicates that the switch 102 has been enabled. Accordingly, when this indication is determined by the microprocessor 128 the transistor 132 is operably controlled to cease the load lowering impedance mode. More specifically, during the enablement of the load lowering impedance mode, the zero crossing detector circuit 134 of the transistor 132 may be configured to reduce a line impedance to a particular value during disablement of the switch 102 to determine a zero crossing portion of the AC sinusoidal waveform of the AC power cycle. Accordingly, a path is defined through the lamp 104 for powering the switch 102 without the connection of the neutral wire 108 to the switch 102.

In one embodiment, the AC power cycle may also be utilized for bilateral communications between the switch 102 and the lamp 104 based on a modulation of line impendence that may be implemented during durations of the brief interruptions to the AC power cycle by the transistor 132 of the lamp 104. In such circumstances, the microprocessor 128 of the lamp 104 may be configured to process one or more digital data packets that may be communicated from the lamp 104 to the switch 102 by storing an amount of power upon the power storage that may be operably connected to the AC driver 130. Accordingly, in some configurations, the lamp 104 may be briefly (e.g., for 1 ms) powered through power stored on the power storage to allow the microprocessor 128 to communicate digital data packets from the lamp 104 to the switch 102. The digital data packets that may be communicated from the lamp 104 to the switch 102 may include status messages that may be associated with the operation and/or functions of lamp 104. Such status messages may include, but may not be limited to, a confirmation of a brightness/color temperature/alert setting change, a health of one or more components of the lamp 104, a lighting source (bulb) status of the lamp 104, an alert associated with a third-party component/computing system associated with the lamp 104, and the like.

In one configuration, the lamp 104 may include a memory 122 that may be configured to store data files associated with one or more applications, operating systems, user interfaces, and executable instructions, including, but not limited to executable instructions that are executed by the microprocessor 128. The memory 122 may be configured to store binary codes that may pertain to respective status messages that are associated with the lamp 104. In one embodiment, during the processing of one or more digital data packets that are to be communicated through the AC power cycle from the lamp 104 to the switch 102, the microprocessor 128 may be configured to access the memory 136 to retrieve respective binary codes values and may thereby encrypt the binary codes within respective portions of the respective digital data packets. Accordingly, the microprocessor 128 may be configured to communicate the one or more digital data packets from the pair of primary electrical contacts 126a, 126b through the AC power cycle to be evaluated by the processor 110 of the switch 102.

In one or more embodiments, the lamp 104 may also include a communication unit 138 that may be operably controlled by the microprocessor 128. The communication unit 138 may be capable of providing wired or wireless computer communications utilizing various protocols to send/receive non-transitory signals internally to the plurality of components of the lamp 104 and/or externally to external devices such as one or more externally hosted computing systems that may be executing associated software applications to provide an external interface to the lamp 104 and/or additional computing systems that may be connected to the lamp 104. Generally, these protocols include a wireless system (e.g., IEEE 802.11 (Wi-Fi), IEEE 802.15.1 (Bluetooth®)), a near field communication system (NFC) (e.g., ISO 13157), a local area network (LAN), and/or a point-to-point system. The communication unit 138 may also be configured to receive radio frequency signals that may be communicated through one or more radio frequency channels/bands.

In one embodiment, the communication unit 138 may be configured to communicate (e.g., wirelessly exchange electronic data) with one or more externally hosted computing systems to output status data associated with the status of the lamp 104. Such outputs may include information pertaining to the operation of the lamp, and may include an enablement/disablement status of the lamp 104, real-time brightness settings being implemented by the lamp 104, real-time color temperature settings being implemented by the lamp 104, and/or one or more notification alerts associated with real-time alerts that may be executed by the lamp 104 (e.g., based on one or more conditions). In some embodiments, the communication unit 138 may be configured to wirelessly communicate such outputs directly to the communication unit 124 of the switch 102 to enable the processor 110 to determine a real-time status of the lamp 104. This functionality may provide redundancy with respect to switch 102 determining the operation and functionality of the lamp 104 as the switch 102 may receive such data in the form of one or more digital data packets that are communicated from the lamp 104 to the switch 102 through the AC power cycle in addition to receiving the wireless signals that may communicate the real-time status of the lamp 104.

II. Exemplary Embodiments and Methods for Providing High Power Factor Wired Lamp Control The specific functionality and processes associated with providing high power factor wired lamp control will now be discussed. FIG. 4 is a schematic view of a plurality of modules 402-408 of the load control ASIC 112 of the switch 102 that may execute computer-implemented instructions for providing high power factor wired lamp control according to an exemplary embodiment of the present disclosure. In an exemplary embodiment, the plurality of modules 402-408 may include a switch input determinant module 402, a packet processing module 404, a zero crossing determinant module 406, and a line command execution module 408. It is appreciated that the load control ASIC 112 may include one or more additional modules and/or sub-modules that are included in addition to or in lieu of the modules 402-408.

Figure 5:
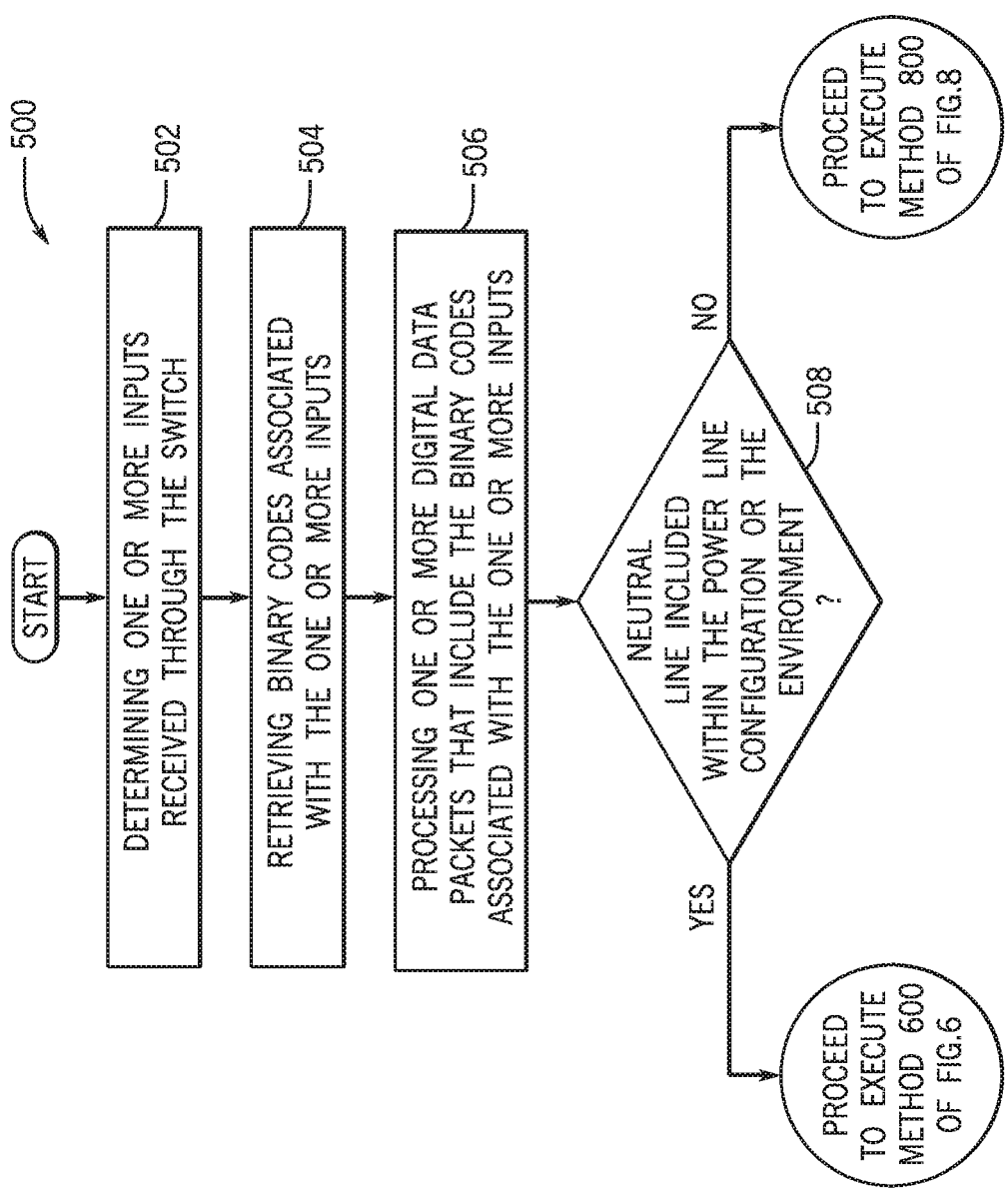
FIG. 5 is a process flow diagram of a method for determining switch based input commands and processing one or more digital data packets to be further communicated to a lamp through interruptions of an AC power cycle according to an exemplary embodiment of the present disclosure.

FIG. 5 is a process flow diagram of a method 500 for determining switch based input commands and processing one or more digital data packets to be further communicated to the lamp 104 through interruptions of the AC power cycle according to an exemplary embodiment of the present disclosure. FIG. 5 will be described with reference to the exemplary embodiments of FIGS. 1-4, through it is appreciated that the method 500 of FIG. 5 may be used with additional and/or alternative embodiments and/or components. The method 500 may begin at block 502, wherein the method 500 may include determining one or more inputs received through the switch 102.

In an exemplary embodiment, the switch input determinant module 402 of the load control ASIC 112 may be configured to determine if one or more inputs have been received (e.g., by a user) through the one or more input buttons 114a-114d of the switch 102 and/or externally hosted computing systems that may be executing associated software applications to provide an external interface to the switch 102. In one configuration, upon receiving one or more respective inputs to one or more of the input buttons 114a-114d to enable/disable the lamp 104, set favorite settings, modify brightness settings, color temperature settings, and/or alert settings of the lamp 104, the switch input determinant module 402 may receive one or more corresponding electronic signals associated with the respective input.

In another configuration, the switch input determinant module 402 may be configured to communicate with the communication unit 124 of the switch 102 to receive one or more corresponding signals that may pertain to the receipt of one or more respective inputs that may be provided from externally hosted computing systems. Such inputs may also be provided to enable/disable the lamp 104, set favorite settings, and/or modify brightness settings, modify color temperature settings, and/or modify alert settings of the lamp 104. Upon the receipt of the corresponding signals from the input buttons 114a-114d and/or the communication unit 124, the switch input determinant module 402 may thereby determine that one or more inputs have been received through the switch 102. Upon making such a determination, the switch input determinant module 402 may be configured to communicate data pertaining to the inputs received to the packet processing module 404 of the load control ASIC 112.

The method 500 may proceed to block 504, wherein the method 500 may include retrieving binary codes associated with the one or more inputs. In one embodiment, upon receiving data pertaining to the inputs received through the switch 102, the packet processing module 404 may be configured to analyze the data and determine operations and/or functions of the lamp 104 that are to be implemented or modified based on the one or more received inputs. Such operations and/or settings of the lamp 104 may include enablement of the lamp 104, disablement of the lamp 104, and/or the implementation/modification of favorite settings, brightness settings, color temperature settings, and/or alert settings.

In one configuration, upon determining the one or more settings that are associated with the one or more received inputs, the packet processing module 404 may be configured to access the memory 122 of the switch 102 to retrieve one or more binary codes that may each specifically pertain to the one or more determined settings. As discussed above, the memory 122 may be configured to store encrypted binary codes that pertain to respective settings that are associated to inputs that may be received through the physical input buttons 114a-114d of the switch 102 and/or through externally hosted computing systems that may be executing associated software applications to provide an external interface to the switch 102. Accordingly, the packet processing module 404 may be configured to retrieve the encrypted binary codes that pertain to respective settings that are associated to the one or more inputs received through the switch 102.

The method 500 may proceed to block 506, wherein the method 500 may include processing one or more digital data packets that include the binary codes associated with the one or more inputs. In an exemplary embodiment, upon retrieving the one or more binary codes that are associated with the one or more inputs received through the switch 102, the packet processing module 404 may be configured to process one or more digital data packets that include the binary codes. The packet processing module 404 may be configured to process each of the digitally encrypted packets as an n bit data packet that may include a plurality of portions. Referring again to the illustrative example of FIG. 3, discussed above, each of the portions 304-318 of the one or more digital data packets 302 may be allocated to particular bits and may be encrypted with one or more binary codes that have been retrieved from the memory 122 (as discussed with respect to block 504).

With continued reference to FIG. 5, the method 500 may proceed to block 508, wherein the method 500 may include determining if a neutral wire 108 is included within the power line configuration of the environment. As discussed above with respect to the illustrative example of FIG. 2A, some environments (e.g., commercial environments) may include a modern electrical configuration that includes the hot wire 106 and the neutral wire 108 connection to the switch 102 that allows the flow of electricity from the switch 102 through the lamp 104 to the neutral wire 108 to complete a circuit. Alternatively, as discussed with respect to the illustrative example of FIG. 2B, some environments may include a legacy electrical configuration in which there is no connection between the neutral wire 108 and the switch 102. In one embodiment, the packet processing module 404 may communicate with the transistor 116 of the switch 102 to determine if there is a connection between the neutral wire 108 and the switch 102 or if there is no connection between the neutral wire 108 and the switch 102. The packet processing module 404 may thereby determine if the neutral wire 108 is included within the power line configuration of the environment.

Figure 6:
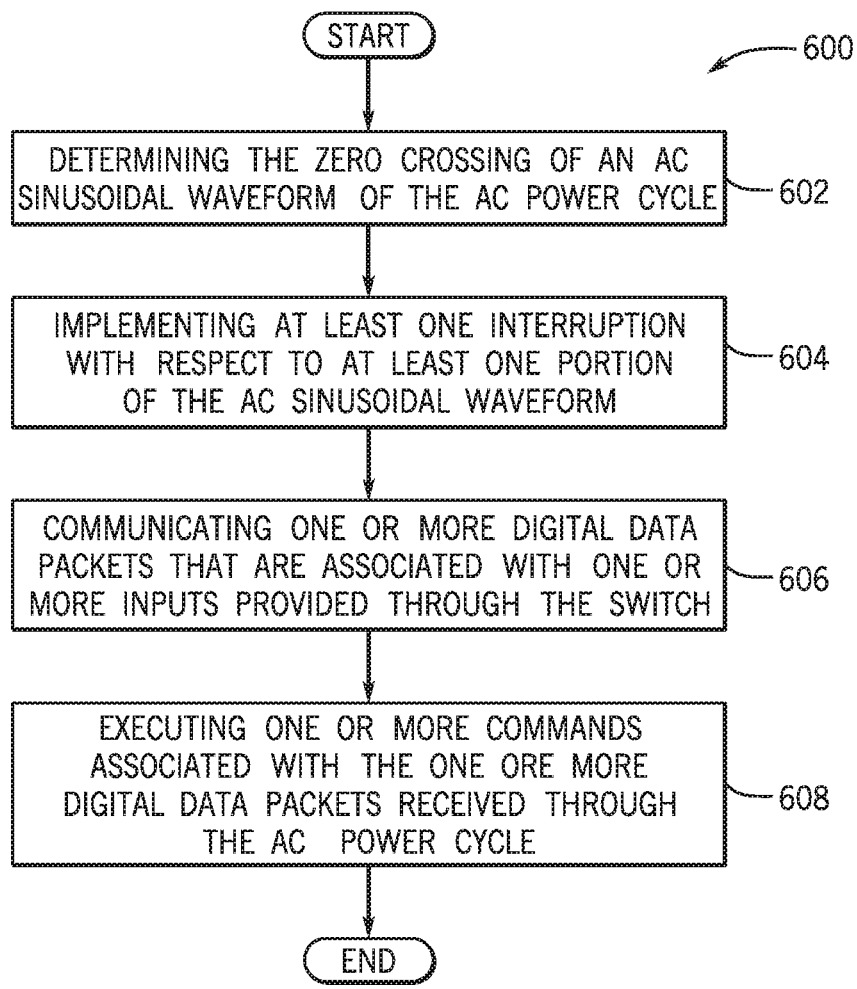
FIG. 6 is a process flow diagram of the method for communicating commands and associated data between the switch and the lamp through the AC power cycle in a modern electrical configuration that includes the connection between the neutral wire and the switch according to an exemplary embodiment of the present disclosure.

If it is determined that the neutral line is included within the power line configuration of the environment (at block 508), the load control ASIC 112 may be configured to execute a method 600 of FIG. 6. FIG. 6 includes a process flow diagram of the method 600 for communicating commands and associated data between the switch 102 and the lamp 104 through the AC power cycle in a modern electrical configuration that includes a neutral wire 108 according to an exemplary embodiment of the present disclosure. FIG. 6 will be described with reference to the exemplary embodiments of FIGS. 1-4, through it is appreciated that the method 600 of FIG. 6 may be used with additional and/or alternative embodiments and/or components.

The method 600 may begin at block 602, wherein the method 600 may include determining the zero crossing of an AC sinusoidal waveform of the AC power cycle. In an exemplary embodiment, the zero crossing determinant module 406 of the load control ASIC 112 may be configured to communicate with the zero crossing detector circuit 118 of the switch 102 to determine the zero crossing (portions) of the AC power cycle. As shown in the illustrative example of FIG. 7A, an AC sinusoidal waveform 700 of the AC power cycle may be analyzed during a normal cycle (e.g., uninterrupted cycle) by the zero crossing detector circuit 118 to detect zero crossing portions 702a-702e of the AC power cycle when the AC load voltage is crossing zero volts. As shown, the zero crossing portions 702a-702e of the AC sinusoidal waveform 700 may be detected by the zero crossing detector circuit 118 at the beginning, middle, and end portions of the AC sinusoidal waveform 700.

Referring again to FIG. 6, the method 600 may proceed to block 604, wherein the method 600 may include implementing at least one interruption with respect to at least one portion of the AC sinusoidal waveform 700. In an exemplary embodiment, upon determining the zero crossing of the AC sinusoidal waveform 700 of the AC power cycle between the switch 102 and the lamp 104, the zero crossing determinant module 406 may be configured to communicate data pertaining the zero crossing portions 702a-702e of the AC sinusoidal waveform 700 to the line command execution module 408 of the load control ASIC 112.

Figure 7B:
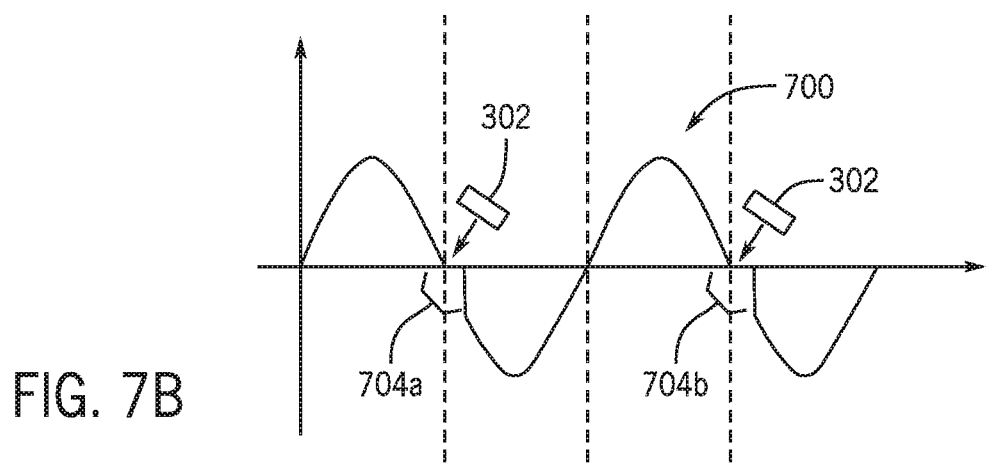
FIG. 7B is an illustrative example of interrupting one or more portions of a rising edge of the AC sinusoidal waveform for brief predetermined periods of time with respect to the modern electrical configuration according to an exemplary embodiment of the present disclosure.
Figure 7C:
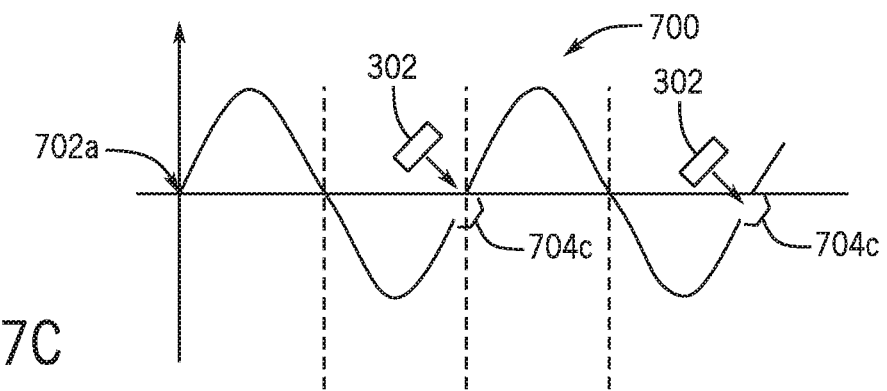
FIG. 7C is an illustrative example of interrupting one or more portions of a falling edge of the AC sinusoidal waveform for brief predetermined periods of time with respect to the modern electrical configuration according to an exemplary embodiment of the present disclosure.

In one embodiment, upon receiving data associated with the zero crossing portions 702a-702e of the AC sinusoidal waveform 700, the line command execution module 408 may be configured to interrupt the AC sinusoidal waveform 700 of the AC power cycle for brief predetermined periods of time (e.g., 1 ms). In one configuration, as shown in the illustrative example of FIG. 7B, the line command execution module 408 may be configured to operably control the transistor 116 of the switch 102 to interrupt one or more portions 704a, 704b of the rising edge of the AC sinusoidal waveform 700 for brief predetermined periods of time within a predetermined short time and distance of the determined zero crossing of the AC sinusoidal waveform 700. In an alternate configuration, as shown in the illustrative example of FIG. 7C, the line command execution module 408 may be configured to operably control the transistor 116 to interrupt one or more portions 704c, 704d of the falling edge of the AC sinusoidal waveform 700 for brief predetermined periods of time within a predetermined short time and distance of the determined zero crossing of the AC sinusoidal waveform 700.

The line command execution module 408 may be configured to operably control the transistor 116 to interrupt one or more of the portions 704a-704d of the AC sinusoidal waveform 700 at every other half-cycle to space out the interruptions to the AC sinusoidal waveform 700. The line command execution module 408 may be configured to interrupt the AC power cycle at edges of the AC sinusoidal waveform 700 at portions that are particularly close to the determined zero crossing where the AC load voltage is crossing zero volts to minimize an amount of power disturbance with respect to the operation of the lamp 104. For example, with reference to FIG. 7A and FIG. 7B, the power interruptions may not affect the operability of the lamp 104 as they may occur at respective portions 704a, 704b of the AC sinusoidal waveform 700 that are particularly close to the determined zero crossing portions 702b, 702d of the AC sinusoidal waveform 700. As discussed, during enablement of the lamp 104 any minute interruptions in power flow to the lamp 104 may be avoided based on the provision of stored AC power that may be provided to the AC driver 130 from the operably connected power storage of the lamp 104. Accordingly, the lamp 104 may operate with little to no flickering as the AC power cycle is interrupted by the switch 102.

Referring again to the method 600 of FIG. 6, upon implementing at least one interruption with respect to at least one portion of the AC sinusoidal waveform 700, the method 600 may proceed to block 606, wherein the method 600 may include communicating one or more digital data packets that are associated with one or more inputs provided through the switch 102. As discussed above, with respect to block 506 of the method 500, the packet processing module 404 of the load control ASIC 112 may be configured to process one or more digital data packets that include the binary codes associated with the one or more inputs. Upon processing the one or more data packets, the packet processing module 404 may be configured to communicate the data packets to the line command execution module 408 to be further communicated to the lamp 104 through the AC power cycle.

In one embodiment, upon implementing at least one interruption with respect to at least one portion of the AC sinusoidal waveform 700 of the AC power cycle, the line command execution module 408 may be configured to input at least one of the digital data packets to be communicated during respective brief interruptions to the AC power cycle. Accordingly, one or more digital data packets that may be associated with inputs to enable/disable the lamp 104, set favorite settings, and/or modify brightness settings, color temperature settings, and/or alert settings may be included within one or more respective interrupted portions 704a-704d of the AC sinusoidal waveform 700 to be communicated to the lamp 104 through the AC power cycle.

Stated differently, the line command execution module 408 of load control ASIC 112 may be configured to communicate the one or more digital data packets to the lamp 104 to thereby execute one or more associated operations and/or functions of the lamp 104 based on the inputs received through the switch 102 by interrupting the AC power cycle for brief predetermined periods of time to send the one or more digital data packets to the lamp 104. For example, as shown in the illustrative example of FIG. 7B, the digital data packet 302 may be included within an interrupted rising portion 704a of the AC sinusoidal waveform 700. Alternatively, as shown in the illustrative example of FIG. 7C, the digital data packet 302 may be included within an interrupted falling portion 704d of AC sinusoidal waveform 700.

In an exemplary embodiment, upon the communication of the one or more digital data packets, the line command execution module 408 may be configured to cease implementation of one or more interruptions with respect to the AC power cycle. As such, in circumstances where inputs are not received through the switch 102, the packet processing module 404 will not process digital data packets that may be associated with inputs. Accordingly, the line command execution module 408 may cease interrupting one or more portions of the AC sinusoidal waveform 700. The AC sinusoidal waveform 700 may resume to a normal cycle as the AC power cycle is once again included as an uninterrupted sinusoidal waveform (as represented in FIG. 7A).

With continued reference to FIG. 6, upon communicating the one or more digital data packets to the lamp 104 through the AC power cycle, the method 600 may proceed to block 608, wherein the method 600 may include executing one or more commands associated with the one or more digital data packets received through the AC power cycle. In an exemplary embodiment, upon one or more data packets being communicated through the AC power cycle, the pair of primary electrical contacts 126a, 126b of the lamp 104 may be configured to receive the AC power cycle. The AC driver 130 may be configured to analyze the AC power cycle and may determine the interruptions to the power cycle. In one configuration, the AC driver 130 may be configured to determine a value '0' during uninterrupted operation of AC power cycle and a value that '1' pertains to interruption of the AC power cycle. The interruptions to the power cycle may be interpreted by the AC driver 130 as the communication of input commands from the switch 102 to the lamp 104.

The AC driver 130 may accordingly analyze the power cycle to extract one or more digital packets that may be communicated through the AC power cycle. The AC driver 130 may thereby communicate the extracted digital data packets to the microprocessor 128. The microprocessor 128 may further analyze the encrypted binary codes that are included within each of the digital data packets to thereby control one or more lighting sources of the lamp 104 based on the inputs received through the switch 102. More specifically, upon analyzing the one or more digital data packets, the microprocessor 128 may be configured to operably control the AC driver 130 to provide one or more levels of DC power to the one or more lighting sources to enable one or more lighting sources, disable one or more lighting sources, and/or operably control one or more lighting sources of the lamp 104 to provide one or more brightness/dimming levels, color temperature levels and/or alert levels based on respective settings encrypted within the one or more digital data packets 302 communicated to the lamp 104 through the interruptions to the AC power cycle. Stated differently, the microprocessor 128 may control the operability and functionality of the lamp 104 based on the interruptions to the AC power cycle that occur in the power line during the brief predetermined periods of time.

Figure 8:
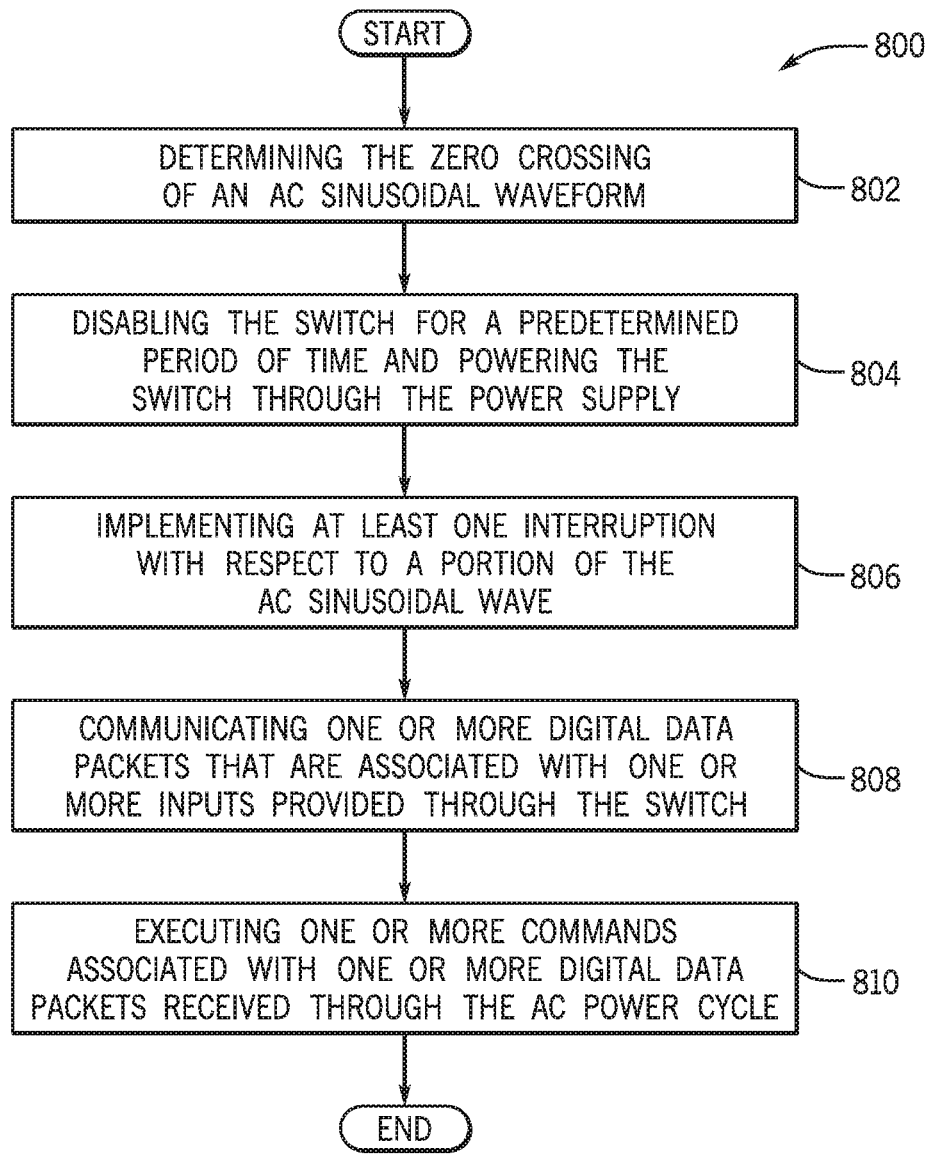
FIG. 8 is a process flow diagram of the method for communicating commands and associated data between the switch and the lamp through the AC power cycle in a legacy electrical configuration that does not include the connection between the neural wire and the switch according to an exemplary embodiment of the present disclosure.

Referring again to the method 500 of FIG. 5, at block 508, if it is determined that the neutral wire 108 is not included within the power line configuration of the environment, the load control ASIC 112 may be configured to execute a method 800 of FIG. 8. FIG. 8 includes a process flow diagram of the method 800 for communicating commands and associated data between the switch 102 and the lamp 104 through the AC power cycle in a legacy electrical configuration in which there is no connection between the neutral wire 108 and the switch 102 according to an exemplary embodiment of the present disclosure. FIG. 8 will be described with reference to the exemplary embodiments of FIGS. 1-4, through it is appreciated that the method 800 of FIG. 8 may be used with additional and/or alternative embodiments and/or components.

The method 800 may begin at block 802, wherein the method 800 may include determining the zero crossing of an AC sinusoidal waveform of the AC power cycle. In an exemplary embodiment, the zero crossing determinant module 406 of the load control ASIC 112 may be configured to communicate with the zero crossing detector circuit 118 of the switch 102 to determine the zero crossing (portions) of the AC power cycle. As shown in the illustrative example of FIG. 7A, the AC sinusoidal waveform 700 of the AC power cycle may be analyzed during a normal cycle by the zero crossing detector circuit 118 to detect zero crossing portions 702*a*-702*e* of the AC power cycle when the AC load voltage is crossing zero volts.

The method 800 may proceed to block 804, wherein the method 800 may include disabling the switch 102 for a predetermined period of time and powering the switch 102 through the power supply. In an exemplary embodiment, upon determining the zero crossing of the AC sinusoidal waveform 700 of the AC power cycle between the switch 102 and the lamp 104, the zero crossing determinant module 406 may be configured to communicate data pertaining the zero crossing portions 702*a*-702*e* of the AC sinusoidal waveform 700 to the line command execution module 408 of the load control ASIC 112.

In one embodiment, upon receiving data associated with the zero crossing portions 702*a*-702*e* of the AC sinusoidal waveform 700, the line command execution module 408 may be configured to disable the switch 102 for a predetermined period of time. The disablement may occur at portions of the falling edge or the rising edge of the AC sinusoidal waveform 700 prior to the reaching the zero crossing. In other words, the switch 102 may be disabled prior to a point in time when the AC load voltage is crossing zero volts.

In one configuration, during the predetermined period of time that the switch 102 is disabled, voltage may appear across the switch 102 to provide power to the power supply 120. This may provide a requisite amount of energy to operate the switch 102 to continually enable the load control ASIC 112 to communicate one or more digital data packets to the lamp 104. In other words, the power supply 120 may be fed based on the voltage that is appearing across the switch 102 in its disabled state before the AC load voltage is crossing zero volts and may thereby be utilized to operate the switch to drive the transistor 116.

Figure 9:
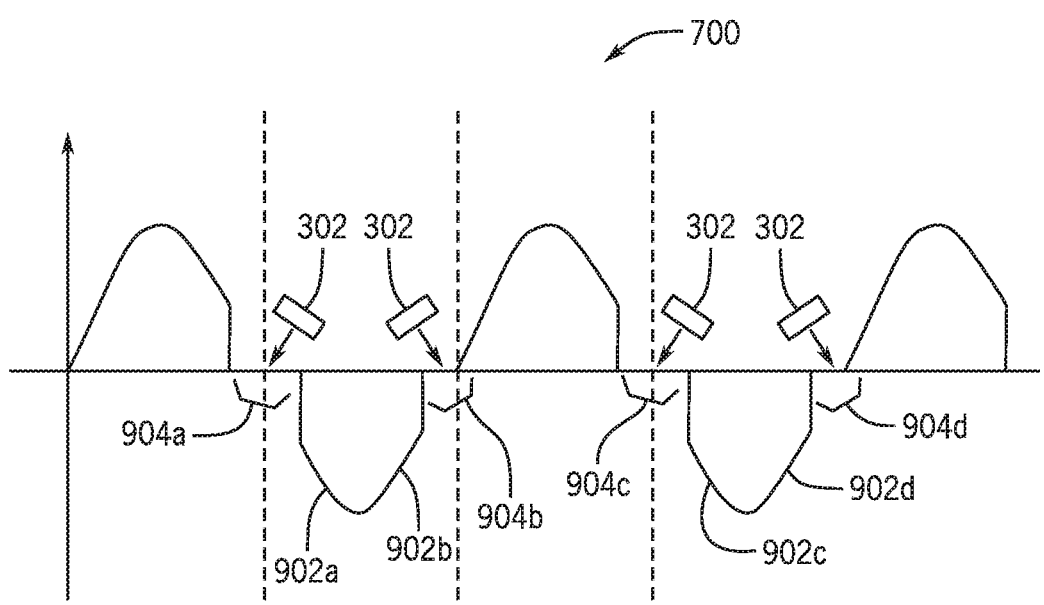
FIG. 9 is an illustrative example of disabling the switch and interrupting one or more portions of the AC sinusoidal waveform for brief predetermined periods of time with respect to the legacy electrical configuration according to an exemplary embodiment of the present disclosure.

As shown in the illustrative example of FIG. 9, the switch 102 may be disabled at one or more particular portions of the falling edges 902*b*, 902*d* or the rising edges 902*a*, 902*c* of cycles of the AC sinusoidal waveform 700. In particular, the line command execution module 408 may be configured to disable the switch 102 during the predetermined periods of time to supply power to the power supply 120 through the voltage being carried across the switch 102. Accordingly, the switch 102 may be operated without the connection between the neutral wire 108 and the switch 102 within the legacy electrical configuration to allow the switch 102 to be operational to communicate one or more commands associated with inputs received through the switch 102 through the AC power cycle.

In some embodiments, the zero crossing detector circuit 118 of the switch 102 may be configured to continue to determine the zero crossing portion of the AC sinusoidal waveform 700 of the AC power cycle between the switch 102 and the lamp 104. As discussed above, the zero crossing detector circuit 134 of the lamp 104 may detect that the switch 102 has been disabled and may send a corresponding signal to the microprocessor 128. The microprocessor 128 may thereby operably control the transistor 132 of the lamp 104 to switch to the load lowering impedance mode to allow the impendence to remain low until the voltage through the power line begins to rise which indicates that the switch 102 has been enabled.

In one configuration, the zero crossing detector circuit 134 of the lamp 104 may be configured to reduce the line impedance during the disablement of the switch 102 and the enablement of the load lowering impedance mode to determine a cleaner measurement of the zero crossing in the lamp 104. In particular, the zero crossing detector circuit 134 may be configured to reduce the line impedance to a particular value (e.g., 1000 ohms) that may be achieved based on the switch 102 being disabled. This functionality may provide a well-defined path through the lamp 104 for effectively supplying power to the power supply 120 of the switch 102 to operate the switch 102 without the connection of the neutral wire 108 within the legacy electrical configuration.

The method 800 may proceed to block 806 wherein the method 800 may include implementing at least one interruption with respect to at least one portion of the AC sinusoidal waveform 700 to communicate at least one digital data packet through the AC power cycle. In an exemplary embodiment, the line command execution module 408 may be configured to interrupt the AC sinusoidal waveform 700 of the AC power cycle for brief predetermined periods of time (e.g., 1 ms). In one embodiment, as shown in the illustrative example of FIG. 9, if the switch 102 is disabled during the falling edge 902*b* of the AC sinusoidal waveform 700 (at block 804), the line command execution module 408 may be configured to operably control the transistor 116 to interrupt one or more portions 904*c* of the (following) rising edge 902*a* of the AC sinusoidal waveform 700 for brief predetermined periods of time within a predetermined short time and distance of the determined zero crossing of the AC sinusoidal waveform 700. Also, as shown, if the switch 102 is disabled during the rising edge 902*a* of the AC sinusoidal waveform 700, the line command execution module 408 may be configured to operably control the transistor 116 to interrupt one or more portions 904*b* of the (following) falling edge 902*b* of the AC sinusoidal waveform 700 for brief predetermined periods of time within a predetermined short time and distance of the determined zero crossing of the AC sinusoidal waveform 700.

The line command execution module 408 may be configured to operably control the transistor 116 to interrupt one or more of the respective portions 904*a*-904*d* of the AC sinusoidal waveform 700 within a predetermined short distance of the zero crossing near respective zero crossing portions of the AC sinusoidal waveform 700. Such interruptions may occur at every other half-cycle to space out the interruptions to the AC sinusoidal waveform 700. The line command execution module 408 may be configured to interrupt the AC power cycle at edges of the AC sinusoidal waveform 700 at portions that are particularly close to the determined zero crossing where the AC load voltage is crossing zero volts to minimize an amount of power disturbance with respect to the operation of the lamp 104. During enablement of the lamp 104 any minute interruptions in power flow to the lamp 104 may thereby be avoided based on the provision of stored AC power that may be provided to the AC driver 130 from the operably connected power storage of the lamp 104.

Referring again to the method 800 of FIG. 8, upon implementing at least one interruption with respect to at least one portion of the AC sinusoidal waveform 700, the method 800 may proceed to block 806, wherein the method 800 may include communicating one or more digital data packets that are associated with one or more inputs provided through the switch 102. In one embodiment, upon implementing at least one interruption with respect to at least one portion of the AC sinusoidal waveform 700 of the AC power cycle, the line command execution module 408 may be configured to input at least one of the digital data packets to be communicated during respective brief interruptions to the AC power cycle. As illustrated in FIG. 9, one or more digital data packets 302 that may be associated with inputs to enable/disable the lamp 104, set favorite settings, and/or modify brightness settings, color temperature settings, and/or alert settings may be included within one or more respective interrupted portions 904*a*-904*d* of the AC sinusoidal waveform 700 to be communicated to the lamp 104 through the AC power cycle.

In an exemplary embodiment, upon the communication of the one or more digital data packets, the line command execution module 408 may be configured to cease implementation of one or more interruptions with respect to the AC power cycle. The AC sinusoidal waveform 700 may resume to a normal cycle as the AC power cycle is once again included as an AC sinusoidal waveform 700 (as represented in FIG. 7A). With continued reference to FIG. 8, upon communicating the one or more digital data packets to the lamp 104 through the AC power cycle, the method 800 may proceed to block 810, wherein the method 800 may include executing one or more commands associated with the one or more digital data packets received through the AC power cycle.

As discussed above, the microprocessor 128 of the lamp 104 may be configured to operably control the AC driver 130 to provide one or more levels of DC power to the one or more lighting sources to enable one or more lighting sources, disable one or more lighting sources, and/or operably control one or more lighting sources of the lamp 104 to provide one or more brightness/dimming levels, color temperature levels and/or alert levels based on respective settings encrypted within the one or more digital data packets 302 communicated to the lamp 104 through the interruptions to the AC power cycle based on the inputs received through the switch 102.

In one or more embodiments, upon executing the one or more commands associated with the one or more digital data packets received through the AC power cycle, the microprocessor 128 may be configured to communicate one or more digital data packets to the switch 102 through the AC power cycle to send a confirmation of the execution of the one or more commands. For example, the microprocessor 128 may be configured to communicate one or more digital data packets to the switch 102 through the AC power cycle to send a confirmation of brightness/color temperature/alert setting change one or more status messages to the switch 102. In particular, the microprocessor 128 of the lamp 104 may be configured to process one or more digital data packets that may be communicated from the lamp 104 to the switch 102 by storing an amount of power upon the power storage that may be operably connected to the AC driver 130.

The functionality of communicating commands and status data between the switch 102 and the lamp 104 through the AC power cycle as discussed above with respect to the method 600 of FIG. 6 and the method 800 of FIG. 8 is completed with a high power factor that maintains sinusoidal voltage and low total harmonic distortion with respect to the power line.

Figure 10:
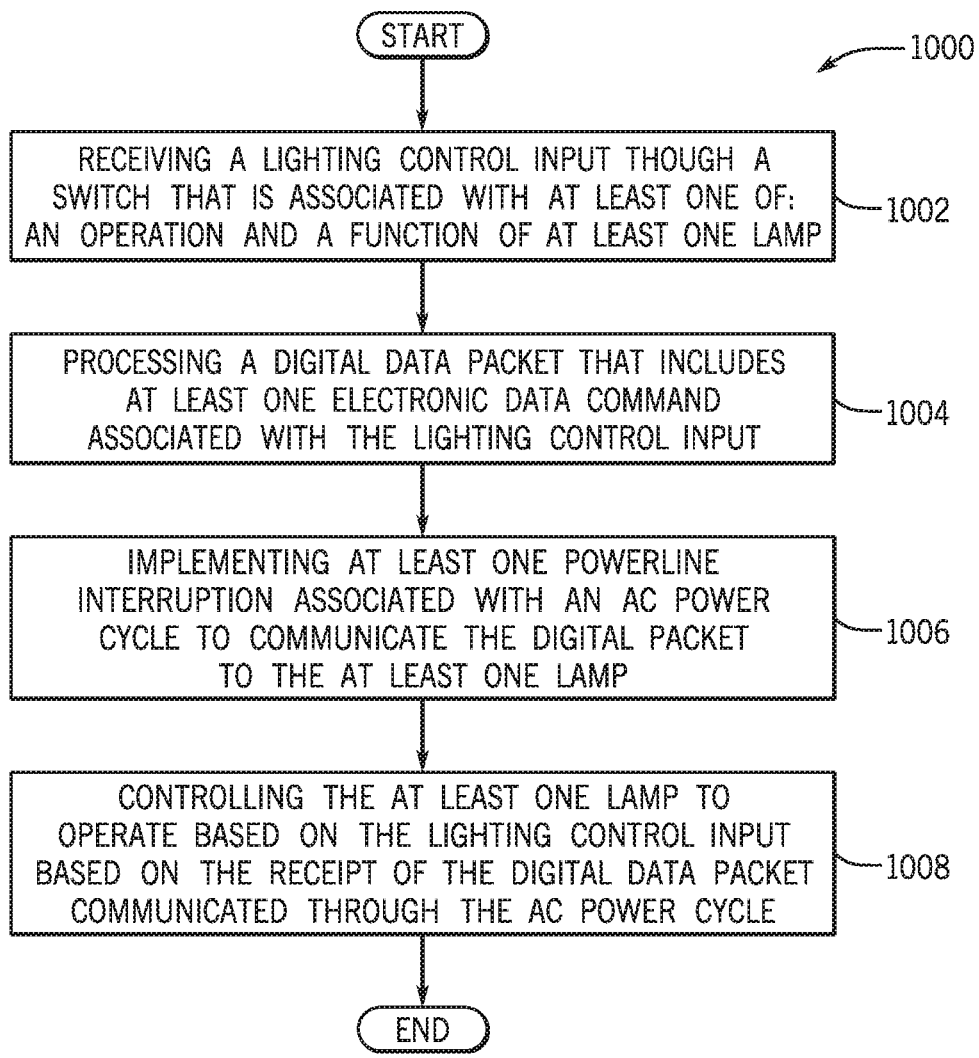
FIG. 10 is a process flow diagram of a method for providing high power factor wired lamp control according to an exemplary embodiment of the present disclosure.

FIG. 10 is a process flow diagram of a method 1000 for providing high power factor wired lamp control according to an exemplary embodiment of the present disclosure. FIG. 10 will be described with reference to the exemplary embodiments of FIGS. 1-4, through it is appreciated that the method 1000 of FIG. 10 may be used with additional and/or alternative embodiments and/or components. The method 1000 may begin at block 1002, wherein the method 1000 may include receiving a lighting control input though a switch 102 that is associated with at least one of: an operation and a function of at least one lamp 104.

The method 1000 may proceed to block 1004, wherein the method 1000 may include processing a digital data packet that includes at least one electronic data command associated with the lighting control input. The method 1000 may proceed to block 1006, wherein the method 1000 may include implementing at least one powerline interruption associated with an AC power cycle to communicate the digital data packet to the at least one lamp 104. In one embodiment, the at least one powerline interruption includes interrupting an AC sinusoidal waveform of the AC power cycle to input the digital data packet through the AC power cycle. The method 1000 may proceed to block 1008, wherein the method 1000 may include controlling the at least one lamp to operate based on the lighting control input based on the receipt of the digital data packet communicated through the AC power cycle.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown. It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing high power factor wired lamp control, comprising:
   receiving a lighting control input through a lighting control switch, the lighting control input is associated with at least one of: an operation and a function of at least one lamp;
   processing a digital data packet that includes at least one electronic data command associated with the lighting control input;
   implementing at least one powerline interruption associated with an AC power cycle to communicate the digital data packet to the at least one lamp, wherein the at least one powerline interruption includes interrupting an AC sinusoidal waveform of the AC power cycle to input the digital data packet through the AC power cycle;
   storing an amount of power within a power storage operably connected to an AC driver of the at least one lamp and powering a processor during the powerline interruption and communication of the digital data packet from the power storage; and
   controlling the at least one lamp to operate based on the lighting control input based on the receipt of the digital data packet communicated through the AC power cycle.

2. The computer-implemented method of claim 1, wherein receiving the lighting control input includes receiving the lighting control input that is associated with at least one of: an enablement of the at least one lamp, a disablement of the at least one lamp, a brightness setting of the at least one lamp, a color temperature setting of the at least one lamp, and an alert setting of the at least one lamp.

3. The computer-implemented method of claim 1, wherein processing the digital data packet includes retrieving binary codes pertaining to the at least one electronic data command associated with the lighting control input, wherein at least one portion of the digital data packet that is associated with at least one of: the operation and the function of at least one lamp is encrypted with the binary codes based on the lighting control input.

4. The computer-implemented method of claim 1, wherein implementing the at least one powerline interruption associated with the AC power cycle includes determining at least one zero crossing portion of the AC sinusoidal waveform of the AC power cycle, wherein the at least one zero crossing portion is detected when an AC load voltage is crossing zero volts.

5. The computer-implemented method of claim 4, wherein implementing the at least one powerline interruption associated with the AC power cycle includes interrupting at least one of: a rising portion of the AC sinusoidal waveform and a falling portion of the AC sinusoidal waveform, wherein the AC sinusoidal waveform is interrupted near the at least one zero crossing portion of the AC sinusoidal waveform to minimize an amount of power disturbance with respect to the at least one lamp.

6. The computer-implemented method of claim 4, further including determining if an environment of the at least one lamp includes a legacy electrical configuration that lacks a connection between a neutral wire and the lighting control switch, wherein the lighting control switch is disabled for a predetermined period of time at portions of at least one of: a rising edge and a falling edge of the AC sinusoidal waveform prior to the at least one zero crossing portion of the AC sinusoidal waveform to allow the lighting control switch to be powered through voltage appearing across the lighting control switch during disablement.

7. The computer-implemented method of claim 6, wherein implementing the at least one powerline interruption associated with the AC power cycle when the environment of the at least one lamp includes the legacy electrical configuration includes at least one of: interrupting a following rising portion of the AC sinusoidal waveform upon the disablement of the lighting control switch at a prior falling portion of the AC sinusoidal waveform and interrupting a following falling portion of the AC sinusoidal waveform upon the disablement of the lighting control switch at a prior rising portion of the AC sinusoidal waveform.

8. The computer-implemented method of claim 7, further including reducing a line impedance to a particular value during disablement of the lighting control switch to determine the at least one zero crossing portion of the AC sinusoidal waveform of the AC power cycle, wherein a path is defined through the lamp for powering the lighting control switch without the connection between the neutral wire and the lighting control switch.

9. The computer-implemented method of claim 7, wherein controlling the at least one lamp to operate based on the lighting control input includes the at least one lamp interpreting the at least one powerline interruption as a communication of the lighting control input from the lighting control switch and analyzing the digital data packet communicated through the AC power cycle to operably control at least one lighting source of the lamp based on the lighting control input.

10. The computer-implemented method of claim 1, further including implementing at least one powerline interruption associated with the AC power cycle to communicate at least one digital data packet that includes at least one electronic status message from the at least one lamp to the lighting control switch.

11. The computer-implemented method of claim 10, wherein communicating the at least one digital data packet that includes the at least one electronic status message from the at least one lamp to the lighting control switch includes modulating a line impedance based on energy storage of the power storage of the lamp to utilize the AC power cycle for bilateral communication between the lighting control switch and the lamp.

12. A system for providing high power factor wired lamp control, comprising
a lighting control switch that is configured to electronically control operation of at least one lamp, wherein the lighting control switch includes a memory that stores instructions that are executed by a processor of the lighting control switch and cause the processor to:
receive a lighting control input through the lighting control switch, the lighting control input is associated with at least one of: an operation and a function of the at least one lamp;
process a digital data packet that includes at least one electronic data command associated with the lighting control input;
implement at least one powerline interruption associated with an AC power cycle to communicate the digital data packet to the at least one lamp, wherein the at least one powerline interruption includes interruption of an AC sinusoidal waveform of the AC power cycle to input the digital data packet through the AC power cycle; and
control the at least one lamp to operate based on the lighting control input based on the receipt of the digital data packet communicated through the AC power cycle by storing an amount of power within a power storage operably connected to an AC driver of the at least one lamp and powering a processor during the powerline interruption and communication of the digital data packet from the power storage.

13. The system of claim 12, wherein the at least one lamp is configured as a tubular light emitting diode lamp and is configured to receive the lighting control input that is associated with at least one of: an enablement of the at least one lamp, a disablement of the at least one lamp, a brightness setting of the at least one lamp, a color temperature setting of the at least one lamp, and an alert setting of the at least one lamp.

14. The system of claim 12, wherein the processor is configured to access the memory and retrieve binary codes pertaining to the at least one electronic data command associated with the lighting control input that are stored upon the memory, wherein at least one portion of the digital data packet that is associated with at least one of: the operation and the function of at least one lamp is encrypted by the processor with the retrieved binary codes based on the lighting control input.

15. The system of claim 12, wherein the processor is operably connected to a zero crossing detector circuit, wherein the zero crossing detector circuit is configured to determine at least one zero crossing portion of the AC sinusoidal waveform of the AC power cycle, wherein the at least one zero crossing portion is detected when an AC load voltage is crossing zero volts.

16. The system of claim 15, wherein the zero crossing detector circuit is configured as an opto-isolator circuit that is isolated from a main circuit of the lighting control switch and is configured to measure the at least one zero crossing portion by drawing power through a ground circuit.

17. The system of claim 15, wherein the processor is operably connected to a transistor of the lighting control switch, wherein the transistor is configured to interrupt at least one of: a rising portion of the AC sinusoidal waveform and a falling portion of the AC sinusoidal waveform, wherein the AC sinusoidal waveform is interrupted near the at least one zero crossing portion of the AC sinusoidal waveform to minimize an amount of power disturbance with respect to the at least one lamp.

18. The system of claim 17, wherein the transistor is configured to determine if an environment of the at least one lamp includes a legacy electrical configuration that lacks a connection between a neutral wire and the lighting control switch, wherein the processor is configured to disable the lighting control switch for a predetermined period of time at portions of at least one of: a rising edge and a falling edge of the AC sinusoidal waveform prior to the at least one zero crossing portion of the AC sinusoidal waveform to allow the lighting control switch to be powered through voltage appearing across the lighting control switch during disablement.

19. The system of claim 18, wherein the transistor is configured to implement the at least one powerline interruption associated with the AC power cycle when the environment of the at least one lamp includes the legacy electrical configuration by executing at least one of: an interruption of a following rising portion of the AC sinusoidal waveform upon the disablement of the lighting control switch at a prior falling portion of the AC sinusoidal waveform and an interruption of a following falling portion of the AC sinusoidal waveform upon the disablement of the lighting control switch at a prior rising portion of the AC sinusoidal waveform.

20. The system of claim 18, further including a transistor of the at least one lamp reducing a line impedance to a particular value during disablement of the lighting control switch to determine the at least one zero crossing portion of the AC sinusoidal waveform of the AC power cycle, wherein a path is defined through the at least one lamp for powering the lighting control switch without the connection between the neutral wire and the lighting control switch.

21. The system of claim 18, wherein the at least one lamp includes a microprocessor that is operably connected to an AC the AC driver of the at least one lamp, wherein the AC driver is configured to interpret the at least one powerline interruption as a communication of the lighting control input from the lighting control switch and the microprocessor is configured to analyze the digital data packet communicated through the AC power cycle to operably control the AC driver to provide at least one level of DC power to at least one lighting source of the lamp based on the lighting control input.

22. The system of claim 21, wherein the microprocessor is configured to implement impedance modulation associated with the AC power cycle to communicate at least one digital data packet that includes at least one electronic status message from the at least one lamp to the lighting control switch.

23. The system of claim 22, wherein the microprocessor is configured to modulate a line impedance based on energy storage of the power storage of the lamp to utilize the AC power cycle for bilateral communication between the lighting control switch and the lamp.

24. A non-transitory computer readable storage medium storing instructions that when executed by a computer, which includes a processor perform a method, the method comprising:

receiving a lighting control input through a lighting control switch, the lighting control input is associated with at least one of: an operation and a function of at least one lamp;

processing a digital data packet that includes at least one electronic data command associated with the lighting control input;

implementing at least one powerline interruption associated with an AC power cycle to communicate the digital data packet to the at least one lamp, wherein the at least one powerline interruption includes interrupting an AC sinusoidal waveform of the AC power cycle to input the digital data packet through the AC power cycle;

storing an amount of power within a power storage operably connected to an AC driver of the at least one lamp and powering a processor during the powerline interruption and communication of the digital data packet from the power storage; and controlling the at least one lamp to operate based on the lighting control input based on the receipt of the digital data packet communicated through the AC power cycle.

25. The non-transitory computer readable storage medium of claim 24, further including implementing at least one powerline interruption associated with the AC power cycle to communicate at least one digital data packet that includes at least one electronic status message from the at least one lamp to the lighting control switch.

\* \* \* \* \*